(12) United States Patent  
Miles et al.

(10) Patent No.: US 7,473,887 B2
(45) Date of Patent: Jan. 6, 2009

(54) RESONANT SCANNING PROBE MICROSCOPE

(75) Inventors: Mervyn John Miles, Kingsweston (GB); Andrew David Laver Humphris, Bath (GB); Jamie Kayne Hobbs, Totterdown (GB)

(73) Assignee: University of Bristol of Senate House, Bristol (GB)

( * ) Notice: Subject to any disclaimer, the term of this patent is extended or adjusted under 35 U.S.C. 154(b) by 21 days.

(21) Appl. No.: 10/612,133

(22) Filed: Jul. 2, 2003

(65) Prior Publication Data

US 2004/0051542 A1 Mar. 18, 2004

(30) Foreign Application Priority Data

Jul. 4, 2002 (GB) ................................. 0215581.0
May 6, 2003 (GB) ................................. 0310344.7

(51) Int. Cl.
*H01J 3/14* (2006.01)
*G01N 23/00* (2006.01)
*G01B 5/28* (2006.01)

(52) U.S. Cl. ......................... 250/234; 250/306; 73/105
(58) Field of Classification Search ................. 250/234, 250/306–311; 73/105
See application file for complete search history.

(56) References Cited

U.S. PATENT DOCUMENTS

| | | | |
|---|---|---|---|
| 3,702,398 A | 11/1972 | Van-Essen et al. ........... 250/310 |
| 5,254,854 A * | 10/1993 | Betzig ......................... 250/234 |
| 5,412,980 A | 5/1995 | Elings et al. .................. 73/105 |
| 5,436,448 A | 7/1995 | Hosaka et al. | |
| 5,566,159 A | 10/1996 | Shapira ................. 369/124.02 |
| 5,742,172 A | 4/1998 | Yasutake .................... 324/754 |
| 6,008,489 A | 12/1999 | Elings et al. ................ 250/234 |
| 6,094,971 A | 8/2000 | Edwards et al. ............... 73/105 |
| 6,172,506 B1 | 1/2001 | Adderton et al. ............ 324/458 |
| 6,220,084 B1 | 4/2001 | Chen et al. .................... 73/105 |
| 6,236,783 B1 | 5/2001 | Mononobe et al. ............ 385/43 |

(Continued)

FOREIGN PATENT DOCUMENTS

DE 19531466 10/1996

(Continued)

OTHER PUBLICATIONS

Tran et al., "Zeptofarad (10-21F) Resolution Capacitance Sensor for Scanning Capacitance Microscopy," American Institute of Physics, Jun. 2001, vol. 72, No. 6, pp. 2618-2623.

(Continued)

*Primary Examiner*—Thanh X Luu
(74) *Attorney, Agent, or Firm*—Volpe and Koenig, P.C.

(57) ABSTRACT

A scanning probe microscope detects or induces changes in a probe-sample interaction. In imaging mode, the probe 54 is brought into a contact distance of the sample 12 and the strength of the interaction measured as the probe 54 and sample surface are scanned relative to each other. Image collection is rapidly performed by carrying out a relative translation of the sample 12 and probe 54 whilst one or other is oscillated at or near its resonant frequency. In a preferred embodiment the interaction is monitored by means of capacitance developed at an interface between a metallic probe and the sample. In lithographic mode, an atomic force microscope is adapted to write information to a sample surface.

19 Claims, 5 Drawing Sheets

U.S. PATENT DOCUMENTS

| | | | |
|---|---|---|---|
| 6,404,207 B1 | 6/2002 | Bhushan | 324/671 |
| 6,489,611 B1 | 12/2002 | Aumond et al. | |
| 6,614,227 B2 * | 9/2003 | Ookubo | 324/316 |
| 6,703,614 B1 | 3/2004 | Stifter et al. | 250/306 |
| 6,752,008 B1 * | 6/2004 | Kley | 73/105 |
| 2002/0043101 A1 | 4/2002 | Naitou et al. | |
| 2002/0092982 A1 | 7/2002 | Jhe et al. | |
| 2002/0097046 A1 | 7/2002 | Kitamura | 324/244 |
| 2004/0129873 A1 | 7/2004 | Lindsay et al. | |
| 2004/0182140 A1 | 9/2004 | Weide et al. | |

FOREIGN PATENT DOCUMENTS

| | | |
|---|---|---|
| DE | 19852833 | 5/2000 |
| EP | 0410131 | 1/1991 |
| EP | 0551814 | 7/1993 |
| EP | 0864899 | 9/1998 |
| EP | 545538 A1 | 9/2003 |
| JP | 8129018 | 5/1996 |
| JP | 2000199736 | 7/2000 |
| JP | 20014519 | 1/2001 |
| RU | 2 109 369 | 4/1998 |
| SU | 1531181 | 12/1989 |
| WO | 01/91855 | 12/2001 |
| WO | WO 02/063368 | 8/2002 |

OTHER PUBLICATIONS

M. Antognozzi, et al., A New Method To Measure The Oscillation Of A Cylindrical Cantilever: "The Laser Reflection Detection System," Apr. 2000, Review of Scientific Instruments, vol. 71, No. 4, pp. 1689-1694.

S.K. Sekatskii, et al., Time-Gated Scanning Near-Field Optical Microscopy, Oct. 2, 2000, Applied Physics Letters, vol. 77, No. 14, pp. 2089-2091.

S.H. Simpson, et al., Analysis Of The Effect Arising From The Near-Field Optical Microscopy Of Homogeneous Dielectric Slabs, Sep. 1, 2001, Optics Communications 196, pp. 17-31.

Khaled Karrai, et al., Piezoelectric tip-sample control for near field optical microscopes, Apr. 3, 1995, American Institute of Physics, vol. 66, No. 14, pp. 1842-1844.

Claire E. Jordan, et al., Removing optical artifacts in near-field scanning optical microscopy by using a three-dimensional scanning mode, Sep. 1, 1999, Journal of Applied Physics, vol. 86, No. 5, pp. 2785-2789.

Oshikane et al., 3D-FDTD and experimental analysis of a resonant microcavity probe for high-resolution SNOM, Physics Devices & Information Processing, Jul. 1999, vol. 3791, pp. 57-62.

Oshikane et al., Scanning Near-Field Optical Microscope With A Small Spherical Protrusion Probe Excited With WGM Resonances, Optical Memory & Neural Networks 2000, vol. 9, No. 3, pp. 147-168 (Abstract Only).

* cited by examiner

RESONANT SCANNING PROBE MICROSCOPE

This invention relates to the field of scanning probe microscopes and to a method of scanning such microscopes.

The field of scanning probe microscopy began in 1981 with the development of the scanning tunnelling microscope. Since that date a wide range of probe microscopes have been developed, although they are all based on the same fundamental operational principle: a nanometric probe is mechanically scanned over a sample surface in order to acquire an "interaction map" of the sample space. Each different type of scanning probe microscope (SPM) is characterised by the nature of the local probe and its interaction with the sample surface.

Some probe techniques, scanning near field optical microscopy (SNOM) and photon scanning tunnelling microscopy (PSTM), detect photons generated as a result of probe interaction with an illuminated sample. Others are based on the detection of variations in a probe—sample interaction force. Techniques in this latter group are known generically as scanning force microscopy (SFM). The interaction force may be, for example, magnetic, shear force or thermal, among many others.

Atomic force microscopy (AFM) is the most commonly used scanning probe microscopy technique. The probe in this case is a tip on the end of a cantilever which bends in response to the force between the tip and the sample. An optical lever technique is usually used to measure the bending of the cantilever. Since the cantilever obeys Hooke's Law for small displacements the interaction force between the tip and the sample can be deduced. The AFM is commonly operated in one of two modes. In constant force mode, feedback enables a positioning piezoelectric driver to move the sample (or tip) up or down in response to any change in the interaction force that is detected. In this way, the Interaction force may b held relatively steady and a fairly faithful topographical image of the sample is obtained. Alternatively the AFM may be operated in constant height mode. Topographical changes are then indistinguishable from interaction force variations and so this mode of operation is most useful for imaging very flat samples at high resolution.

A disadvantage of all scanning probe microscopy techniques is data collection time. Typically, the image is made up of 256 lines, each line consisting of 256 points (pixels). A full image scan taken with the necessarily small probe is time consuming. Local probe techniques are increasingly being used to read and write data beyond the λ/2 limitation of conventional optical storage media and it is rapidly becoming apparent that the speed of data processing is limited by the speed with which information can be written and read. Moreover many scientific, industrial and physiological processes occur over too short a timescale to allow them to be followed using current local probe techniques. There is therefore a perceived need to improve image collection times in scanning probe microscopy.

It is an object of this invention to provide a system capable of more rapid collection of sample—probe interactions and thereby to increase information readout or write rates and to open up more scientific, industrial and physiological processes to real-time investigation by scanning probe microscopy.

The present invention provides a scanning probe microscope for imaging a sample in accordance with an interaction between the sample and a probe, the microscope comprising driving means arranged to provide relative motion between the probe and the sample surface and capable of bringing the sample and probe into close proximity, sufficient for a detectable interaction to be established between them; means for oscillating either the probe or the sample in order to provide relative oscillatory motion of the probe across the surface; a probe detection mechanism arranged to measure at least one parameter indicative of the strength of the interaction between the probe and the sample; and a feedback mechanism arranged to provide for adjustment of probe—sample separation via op ration of the driving means in response to a variation in an average value of one of the at least one parameters away from a predetermined set value; characterised in that, the microscope is arranged, in operation, to carry out a scan of the sample surface wherein scan area is covered by an arrangement of scan lines, each scan line being collected by oscillating either the probe or the sample at or near its resonant frequency such that oscillation amplitude determines maximum scan line length and their arrangement is provided by operation of the driving means.

An object oscillating near- or at-resonance exhibits a highly stable, and often rapid, motion. Each scan line is collected as a continuous (analogue) image as either the probe oscillates across the surface of the sample or the surface oscillates beneath the probe. By simultaneously providing relative translational motion between the probe and sample surface, successive scan lines will collect information from different parts of the surface. After covering an area of the surface, scan line information can be collected and reconstituted with appropriate displacements to form an image of the two-dimensional scan area. As mentioned above, resonant oscillatory motion exhibits a high degree of stability. Thus, regardless of whether this motion is executed by the probe or sample, there is reduced noise affecting the image collection. The feedback mechanism serves to maintain, to some degree, height of the probe above the surface by making adjustments in accordance with the average strength of the interaction between probe and sample. Variations in the measured parameter within the timescale of an oscillation therefore constitute the "interaction" image, and are interpreted as arising from true surface features. This provides a far more rapid technique with which to collect interaction image information than is available in the prior art.

Various orientations of oscillation and probe/surface relative translation may be used to cover the scan area. If the oscillation axis is stationary then a linear translation may be applied in a direction which is substantially orthogonal to the sweep of the oscillation, thereby defining a substantially rectangular scan area, as shown in FIG. 4. If the relative translation is continuous, the scan area is rapidly covered by a single, continuous, zigzagging line. Alternatively, a circular arrangement may be generated by providing a relative rotation of probe and sample. Moreover, oscillation and translation may be arranged such that Lissajou figures are described by the probe, relative to the surface.

The parameter indicative of the interaction is preferably capacitance of an interface between probe and sample, and consequently a metallic probe is also preferred. This technique is very useful in mapping charge distributions within semiconductor materials. The improved scanning speed facilitated by the present invention opens up internal semiconductor processes to real-time investigation by probe microscopy.

Alternatively, the parameter indicative of the interaction may be oscillation amplitude. Oscillation amplitude may also be the monitored parameter on which the feedback mechanism is based.

The probe detection mechanism preferably comprises a modulation signal generator arranged to apply a modulating voltage across the interface between probe and sample in order to modulate its characteristics and thereby to affect its electrical capacitance, a resonator arranged to set up a resonating electric field in a circuit incorporating the probe and sample and a detector arranged to measure the electric field resonant frequency and thereby to enable variations in the capacitance of the interface to be measured as the modulating voltage is applied. The advantage of this embodiment of the invention is that it provides an extremely sensitive technique with which to measure capacitance in a scanning capacitance microscope.

Alternatively, the microscope may be a magnetic force microscope with the probe adapted to interact with a magnetic field and the probe detection mechanism arranged to measure a parameter indicative of the magnetic interaction between the probe and the sample.

As a further alternative, the probe may comprise a cantilever and actuator arranged to drive the cantilever in a "tapping" mode. The parameter indicative of the strength of the interaction may then be bending of the cantilever as it taps the sample. Alternatively, it may be amplitude of the oscillation. These embodiments provide an implementation of the invention in an atomic force microscope, which in turn opens up to faster scanning the applications to which the AFM is generally put.

In an AFM implementation the one of the at least one parameter indicative of the strength of the interaction that is measured by the probe detection mechanism and used by the feedback mechanism is bending of the cantilever as the probe tip is brought into contact with the surface. The probe detection mechanism may be arranged to measure probe bending in order to provide both image and feedback information. Optionally, another parameter indicative of the strength of the probe—sample interaction may be used to provide image information. Alternatively, the probe detection mechanism may comprise two components: a first arranged to measure one characteristic of the interaction, for example capacitance, between the probe and the sample and the second linked to the feedback mechanism and arranged to measure bending of the probe.

Either the probe or the sample is oscillated. Further, the probe may be mounted vertically or horizontally, or indeed at an intermediate angle, provided that any oscillation results in the probe carrying out a substantially linear sweep of the sample surface. If the sample is oscillated, then this is preferably achieved by mounting the sample on a tuning fork. Problems may be encountered with coupling between resonant modes as a sample (or probe) is simultaneously oscillated and translated. The tuning fork is designed with high mechanical anisotropy, which discourages such coupling. This improves the stability of the scan. Provided that they possess a similar anisotropy, alternatives to the tuning fork may also be used; for example, a piezoelectric bimorph. The probe may also be oscillated by a tuning fork or bimorph.

The feedback mechanism preferably operates with a time constant which is greater than one cycle of probe oscillation and significantly less than total time taken to perform a scan.

In a second aspect, the present invention provides a method of rapidly collecting image data from a scan area of a sample with nanometric features wherein the method comprises the steps of:—

(a) Moving a probe with tip of sub-nanometric dimensions into close proximity with a sample in order to allow an interaction to be established between probe and sample;

(b) Oscillating either the probe across the surface of the sample at or near its resonant frequency or the sample beneath the probe at or near its resonant frequency whilst providing a relative motion between the probe and surface such that an arrangement of scan lines, whose maximum length is determined by oscillation amplitude, covers the scan area;

(c) Measuring a parameter indicative of the interaction strength;

(d) Monitoring the parameter measured in step (c) or a second parameter that is also indicative of an interaction between probe and sample and, if a value of the monitored parameter falls below or rises above a predetermined set value, adjusting probe—sample separation distance in order to drive the value of the monitored parameter back towards the set value; and (e) Processing measurements taken at step (c) in order to extract information relating to the nanometric structure of the sample.

In a third aspect the AFM embodiment of this invention may be used not to image a sample surface but to affect the sample surface in the locality of the probe. Information may therefore be stored on the sample as a localised change in surface properties, enabling this invention to be applied to the technique of nanolithography.

Embodiments of the invention will now be described by way of example only and with reference to the accompanying drawings FIG. 1 shows a schematic implementation of the invention in a scanning capacitance microscope.

Figure 1:
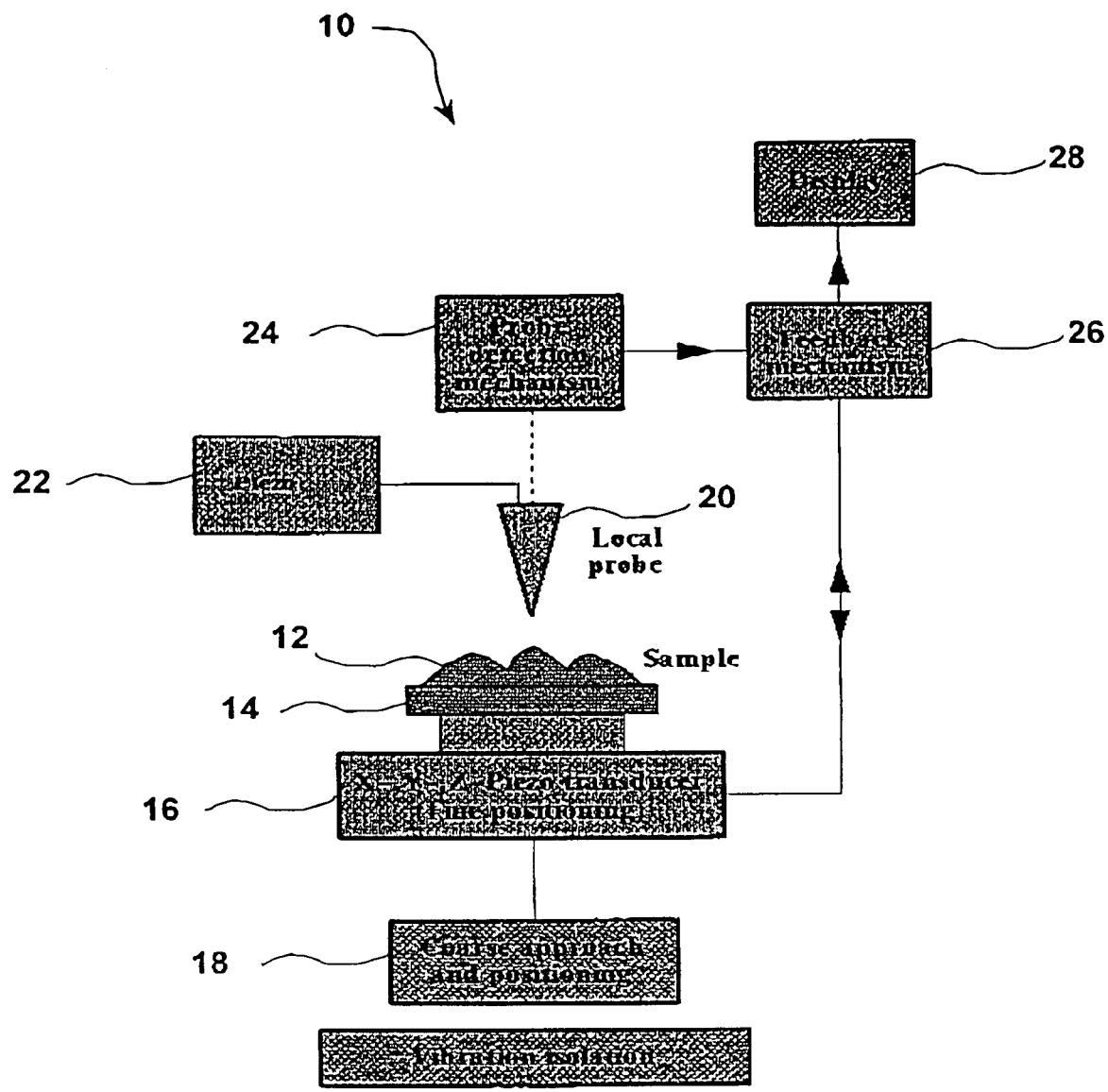

FIG. 1 illustrates a scanning capacitance microscope (SCM) implementation of the invention. A prior art SCM is described in T. Tran et al. ""Zeptofarad" ($10^{-21}$) resolution capacitance sensor for scanning capacitance microscopy", Rev. Sci. Inst. 72(6) p 2618 (2001) and has proved particularly useful in measuring two-dimensional carrier profiles of semiconductor devices. Like the microscope described by Tran et al., the apparatus 10 shown in FIG. 1 comprises an electrically grounded plate 14, adapted to receive a sample 12, which is connected to a piezoelectric transducer 16 and a coarse driving means 18. A metallic probe 20 is connected to a scond piezoelectric driving means 22 which, unlike any prior art SCM driving means, is arranged to drive a near-resonance or resonant oscillation of the probe 20. Either the first 16 or second 22 piezoelectric transducer drives relative vertical motion of the probe 20 and sample 12. In this embodiment, it is the piezo 16 attached to the sample 12. The apparatus includes a probe detection mechanism 24, the particular details of which depend on the indicator of the probe 20—sample 12 interaction that is to be measured, and an embodiment suitable for use with the SCM will be described in more detail later. A feedback mechanism 26 is arranged to drive the first piezo 16 in response to a signal received from the probe detection mechanism 24 and thus to control relative height of the probe 20 and sample 12. Collected data is analysed and output to a display 28.

As is conventional in the field, the z axis of a Cartesian coordinate system will be taken to be that perpendicular to a plane occupied by the sample 12. That is, the probe 20—sample 12 interaction is dependent both on the xy position of the probe 20 over the sample 12 (the pixel it is imaging), and also of its height above it.

Before considering the operation of the apparatus shown in FIG. 1 it is helpful to explain the physics behind the interaction and measurements and hence the function of the probe detection mechanism 24. The scanning capacitance microscope may be used to image a number of sample types, including biological specimens. The development and measurement of capacitance however is most readily understood in relation to semiconductor imaging. When a metal probe is brought into contact with a semiconductor material equalisation of the Fermi energy within the two band structures results in an electrical potential drop being developed across the boundary. This drop sweeps charge carriers out of the boundary region and a depletion layer is form d. This phenomenon is well known and is the basis behind the Schottky barrier diode. It is the capacitance across this depletion layer (or Schottky barrier) that is measured in semiconductors by SCM.

The band structure (and hence effective doping) of biological materials is markedly more complex than that of semiconductors, and the depletion layer theory outlined above is not in general appropriate. It is thought that a reorientation (or induction) of dipoles might be a mechanism in biological specimens which gives rise to a capacitance at the interface. Regardless of the actual mechanism however, the fact remains that a capacitance is developed at the probe—sample interface and this can be detected and measured, in the same way as for semiconductor materials, by the scanning capacitance microscope.

Figure 2:
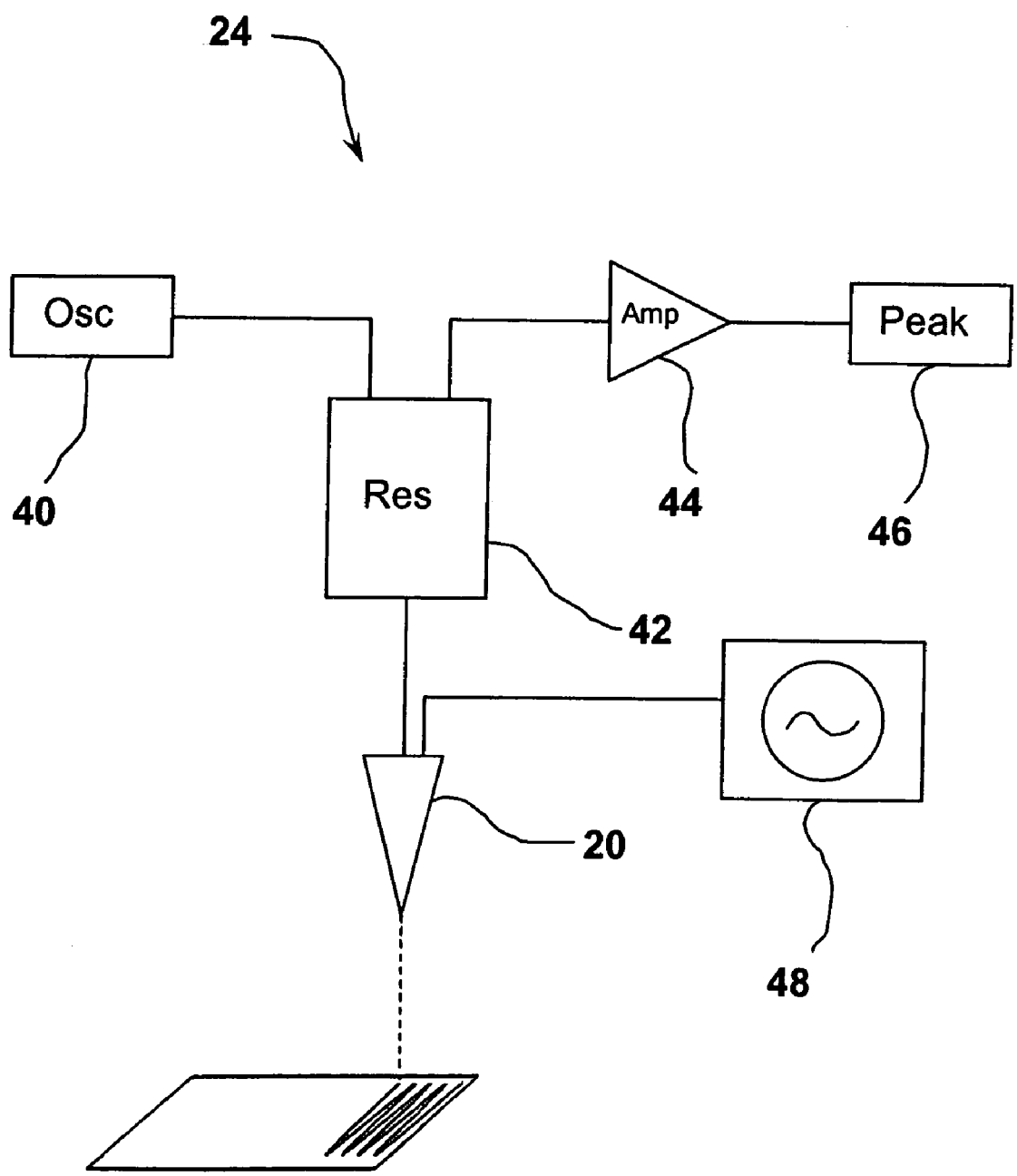
FIG. 2 shows schematically a probe detection mechanism suitable for use in the microscope of FIG. 1.

The probe detection mechanism 24 for use in an SCM embodiment of this invention is shown in FIG. 2. The mechanism 24 comprises a voltage-controlled oscillator 40, a coupled transmission line resonator 42, an amplifier 44, a peak voltage detector 46 and a modulation signal generator 48. The modulation signal generator 48 applies a dc-biased ac sinusoidal voltage to the probe 20. The sample 12 itself is grounded via the plate 14 and so this effectively applies a modulating voltage across the interface between probe 20 and sample 12. This voltage modulates the depletion layer width in semiconductors and hence the capacitance of the barrier. In biological samples, the modulating voltage has a similar modulating effect on the capacitance, although probably through modulation of the dielectric constant. In order to measure interface capacitance, an oscillating electric field is excited in the resonator 48 circuitry by the oscillator 40. The resonance frequency of this field is dependent on the load (in this case an electrical path through probe and sample) on the circuit. The resonant signal is detected within the resonator 48 and amplified by the amplifier 44 before being passed to a p ak detector 46. Variations in the capacitance at the interface (and hence load on the circuit) are reflected in a shift in frequency of the resonance peak, as detected by the peak detector 46. Since the modulation signal causing the capacitance fluctuations is known, determination of the variations in peak position enables the voltage derivative of the interface capacitance (dC/dV) to be determined at the modulation frequency.

Returning to FIG. 1, in taking images using the apparatus 10, the sample 12 is first brought into the proximity of the probe 20 using the coarse driving means 18. Fine height and initial start position adjustments are made with the first 16 piezo driver whilst the probe detection mechanism 24 measures the capacitance arising from the probe 20—sample 12 interaction. Once the measured capacitance reaches a desired level, a raster scan of the sample 12 surface is begun. In scanning the probe 20 over the sample 12, the first piezo 16 controls movement in a y (into the page in the viewpoint shown in FIG. 1) direction. The second piezo 22 drives a near resonant oscillation of the probe 20 about the z axis in the xz (i.e. plane of the Figure) plane. Probe oscillation is with a relatively large amplitude, of the order of a few microns. During the course of a scan, readings are continually taken by the probe detection mechanism 24 of the capacitanc developed between probe 20 and sample 12.

Successive scan lines are collected as the probe 20 oscillates. Each line will therefore have a length equal to twice the oscillation amplitude, this length corresponding to the maximum width of the image. The maximum length of the image is of course determined by the distance the sample 12 is translated in the y direction by the first piezo 16. Oscillation near resonance offers the potential for near-maximum scan width to be obtained for a given drive force. By this means data from the imaged area is collected at a far higher speed than that achieved by prior art scanning capacitance microscopes or any scanning force microscope. Maximum scan width can clearly be achieved in th SCM if the probe is oscillated at resonance.

The feedback mechanism 26 is arranged to keep the average capacitance (averaged over many periods of oscillation) of the probe 20—sample 12 interaction approximately constant. The output of the peak detector 46 (FIG. 2) is fed to the feedback mechanism for this purpose. If at any point in the scan therefore a reduced average capacitance is observed, this indicates that the probe 20—sample 12 interaction has decreased and accordingly separation distance has increased. The feedback mechanism 26 is therefore arranged to drive the first piezo transducer 16 such that it moves the sample 12 and plate 14 towards the probe 20. Conversely, a larger capacitance signal indicates a decrease in probe 20—sample 12 separation and the sample 12 is then lowered. In practice, the average capacitance will vary around its set value. This variation has a number of contributory factors: overshoot in height adjustment, the fact that the time constant of the feedback loop has to be greater than the period of oscillation of the probe and the finite length of time it takes the probe to adjust to a change in interaction (settle time). Any changes in capacitance on timescales less that the period of probe oscillation constitute the image.

It is also important that the time constant of the feedback loop, which must be longer than the period of probe oscillation, and the response time of the probe must be shorter than the time taken to complete the entire scan.

The output signal from the probe detection mechanism 24 (peak detector 46) is fed via the feedback mechanism 26 to a processor and display 28. In order to enable digital data processing, the collected scan line may be artificially pixelated by the processor.

Of course it is not necessary either to collect image data over the entire area covered by the physical probe—sample scan or to process it. In some applications it may be preferable to process only data collected in the more linear part of the probe's oscillatory swing. The physical scan area simply defines the maximum area that can be imaged in one scan cycle.

In order to maximise speed of the scan, each scan line is collected per half-oscillation of the probe. Clearly a better image could be obtained by multiple oscillations on each line although stepping and stopping the piezo drivers 16, 22 in order to provide for multiple traverses of the same line would lead to probe ringing. This would also, clearly, reduce overall scan speed. The speed of the sample piezo transducer 16 however can be set to move the sample as low as around 1 Å per oscillation cycle. With this speed it is possible therefore to perform something akin to integration by adding consecutive lines together so that each line in a processed image becomes the average of, say, five oscillation lines. The increase in signal to noise ratio gained by this "integration" may, in some circumstances, compensate for the loss in resolution.

Figure 5:
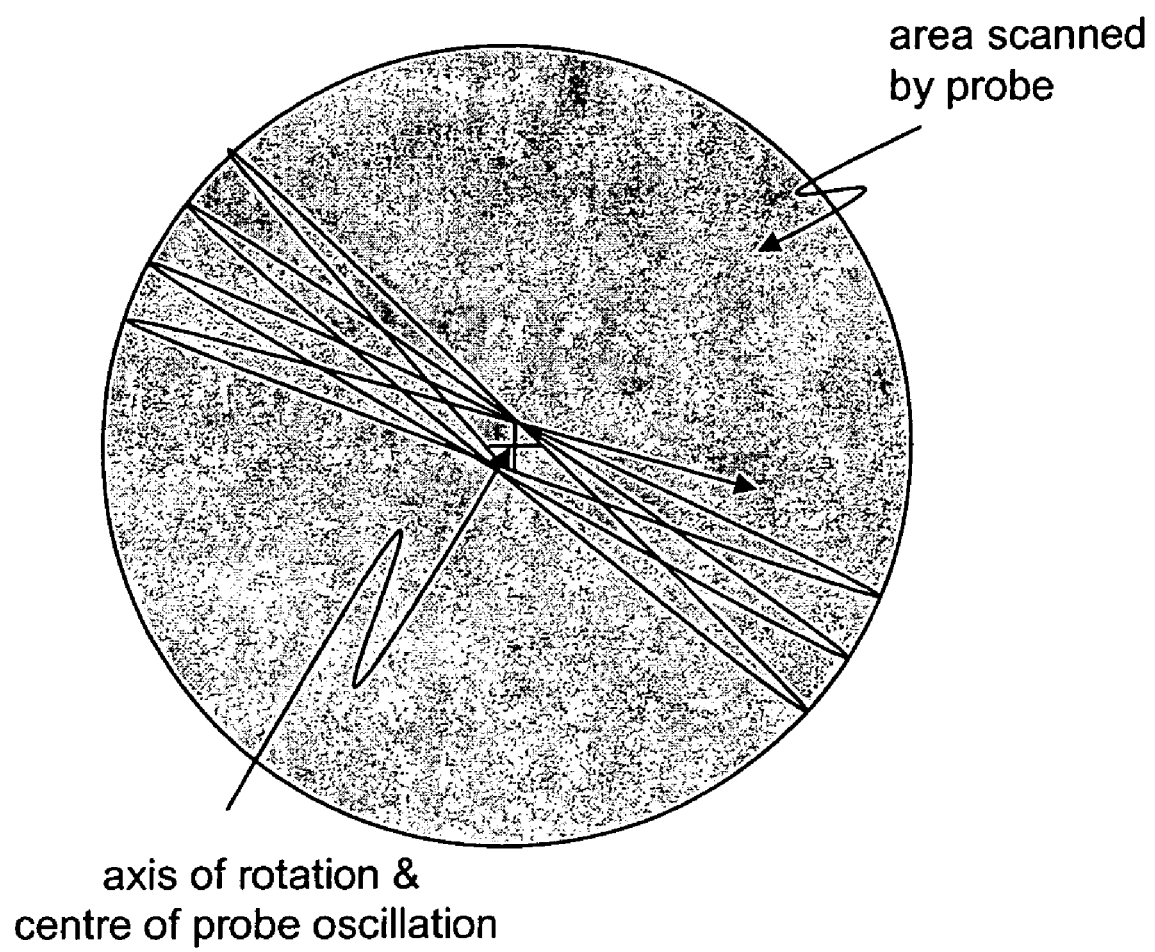
FIG. 5 illustrates a circular arrangement of scan lines in accordance with an alternative embodiment of the present invention.

Although this embodiment of the invention incorporates a piezo 16 which provides for linear motion in the y direction, clearly many other scan geometries can be used. The only requirement, when imaging an area, is that the combination of sample (or, equivalently probe) translation and probe (or, equivalently sample) oscillation covers the area to be imaged. Thus, the sample could be rotated while the probe is oscillated, thereby making up a scan comprising a circular series of scan lines passing through a central point as shown in FIG. 5. Alternatively, the probe could be set to oscillate in two perpendicular directions. If oscillations are then driven in both directions together a non-linear oscillation, such as a figure of eight, will result. If the axis of the figure of eight oscillation was then rotated, the probe movement would cover the scan area in a series of figures of eight passing through a central point.

SCM is very useful for determining carrier profiles within semiconductor devices. Th amplitude of dC/dV (when calibrated) can be used to det rmine the local carrier concentration and its sign gives the type of carrier. The advantage of faster scanning provided by the present invention will enable the SCM technique to be, not least, used to monitor processes occurring within semiconductor devices in real time.

The use of a probe oscillating at resonance to image a sample surface using optical SPM techniques is described in applicant's copending patent application with publication no WO 02/063368. One example described therein monitors the oscillation amplitude of the probe in order to maintain height above the surface. As a probe is brought into the vicinity of a sample, the separation or interaction between probe and sample can be measured in a number of different ways. As described above in relation to the embodiment of this invention illustrated in FIG. 1 the development of a capacitance results from an electrical interaction. Another interaction is the so-called "shear force" damping mechanism. If a vertically-mounted probe is oscillated horizontally, with respect to the sample surface, at a frequency close to its resonant frequency, surface—probe interactions will serve to damp the oscillation amplitude. The damping mechanism, under ambient conditions, is generally thought to be due to a confined water layer on the sample surface, but other damping interactions are also feasible. As the surface is approached by the probe, damping increases and accordingly oscillation amplitude is reduced.

An alternative to the embodiment of the invention shown in FIG. 1 is therefore to adapt the probe detection mechanism 24 both to monitor the oscillation amplitude of the probe as it collects the scan lines and to measure the contact capacitance using the resonator 42 and voltage modulator 48 as before. Probe oscillation amplitude can be monitored by a number of known means, for example by photovoltaic measurement of an oscillating shadow of the probe tip in a light beam. The relative separation between sample 12 and probe 20 is then maintained on the basis of feedback from the oscillation amplitude. If the average (over a numb r of scan lin s) amplitude falls below a set value, the sample 12 must be moved away from the probe 20 and if it rises above this s t value, sample 12 and prob 20 should be brought closer together. This embodiment of the invention makes a two-fold use of probe resonant oscillations: to collect a scan line and to maintain height above the sample. At the same time, a capacitance image is taken of the sample 12.

In this embodiment of the invention the probe is oscillated near-resonance rather than at resonance, which would maximise scan width. This is because there is a greater response by way of amplitude change to a shift in position of the resonance peak when just off resonance. As it is this change in amplitude that is to be measured in this embodiment in order to provide an indication of any variation in probe—sample interaction, oscillating near resonance effectively improves the signal to noise ratio.

In using two different parameters: the first to measure the probe—sample interaction and the second to monitor their separation, the interaction image will be an "absolute"0 image, rather than relative. That is, in this embodiment of the SCM, the capacitance image is formed from absolute values. In the previous embodiment, in which the average capacitance measurement is used to control the separation, the capacitance image obtained is a map of variations from this average value.

The generalised probe detection mechanism 24 shown in FIG. 1 may comprise a number of different measurement tools, depending on the specifics of the probe—sample interaction being imaged.

Figure 3:
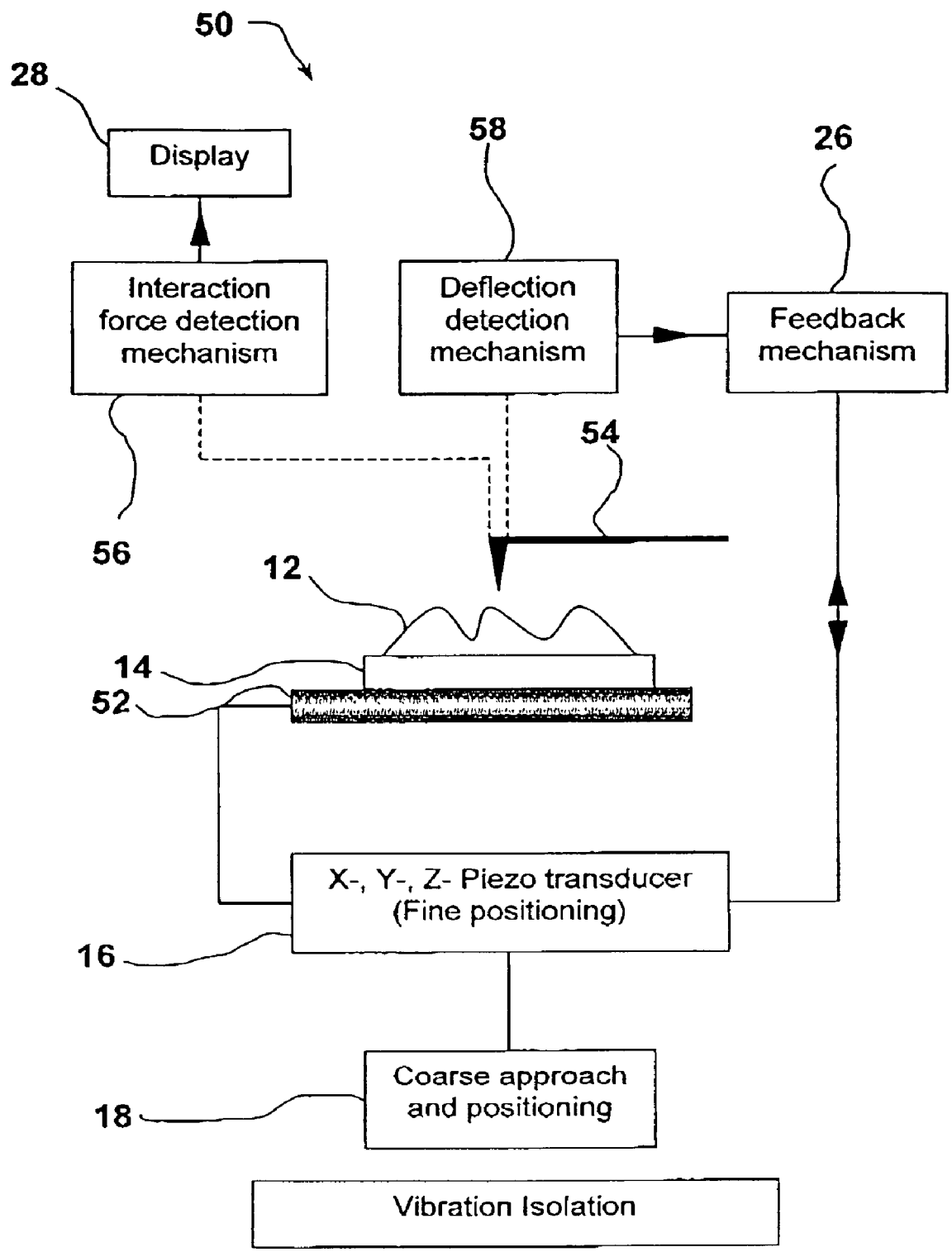
FIG. 3 illustrates schematically an alternative embodiment of the invention, based on an atomic force microscope.
Figure 4:
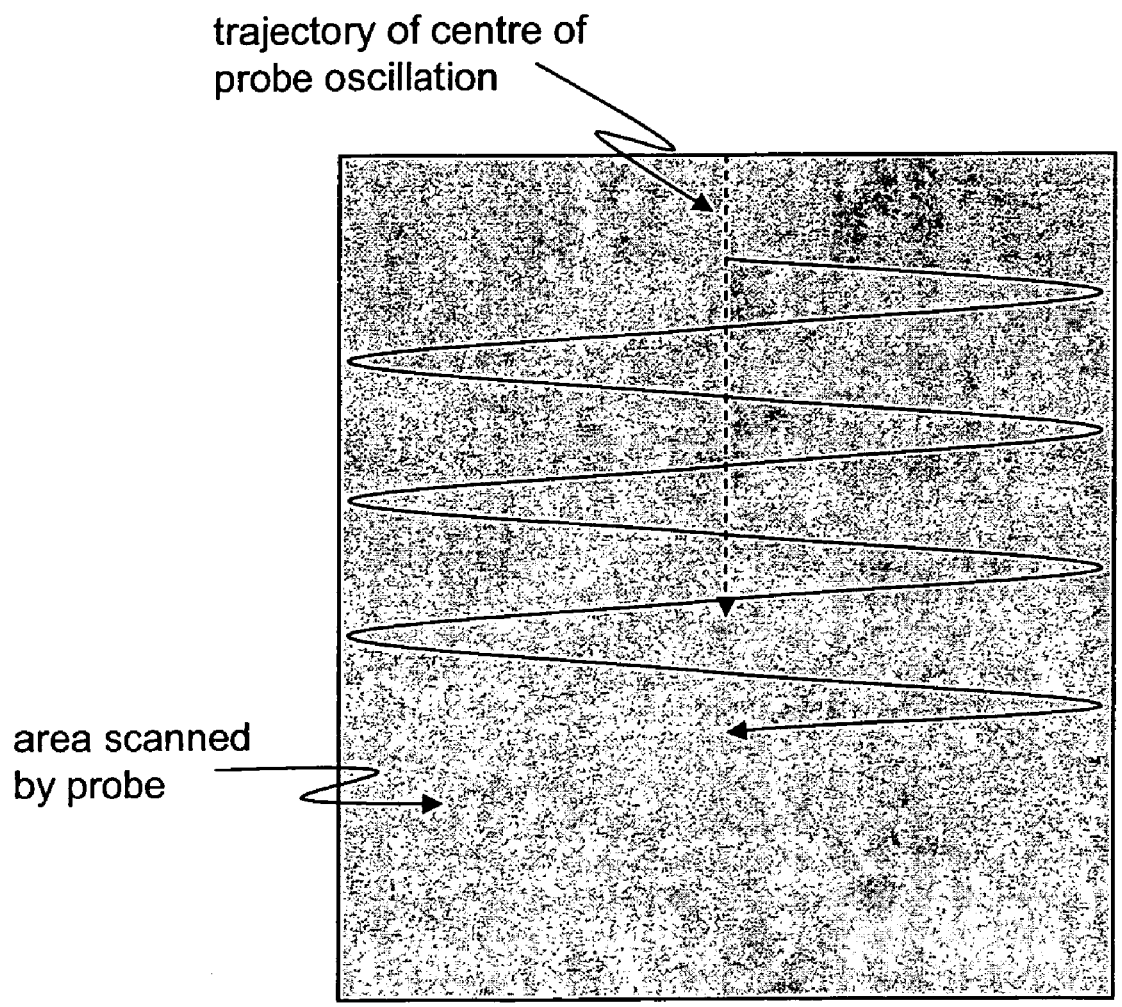
FIG. 4 illustrates a rectangular scan area in accordance with the present invention.

An alternative embodiment of a SPM in accordance with the present invention is shown in FIG. 3. This embodiment is one of those in which probe—sample separation is controlled by monitoring one parameter and the interaction is measured using another. It is based on the atomic force microscope (AFM) and adaptation to base image and feedback on a single parameter only will be apparent to those skilled in the art.

A prior art atomic force microscop suitable for imaging biological samples is described in "A high-speed atomic force microscope for studying biological macromolecules" by Toshio Ando et al., Proc. Nat. Acad. Sci. USA 98(22) p12 468-12 472 (2001) and this equipment may be adapted for use with a resonant image scan. A significant (for purposes of this invention) difference between AFM and SCM is that the former uses a small cantilever with, generally integrated, actuator as probe and bending of this cantilever is used to provide an indication of interaction strength.

FIG. 3 illustrates an AFM microscope 50, in which components common to the SCM of FIG. 1 are like referenced. The AFM apparatus 50 comprises a plate 14, adapted to receive a sample 12, and which is mounted on one prong of a tuning fork 52. The tuning fork 52 is connected to a piezoelectric transducer 16 and a coarse driving means 18. The piezoelectric transducer 16 is used to drive the sample 12 (together with the plate 14 and fork 52) in three dimensions: x, y and z directions, using the notation established in relation to FIG. 1. A tuning fork control (not shown) is arranged to apply a sinusoidal voltage to the tuning fork 52 and so excite a resonant or near-resonant vibration within the xy plane. In this embodiment an interaction is developed between an AFM cantilever probe 54 and the sample surface. Two probe detection mechanisms are present: an interaction detection mechanism 56 and a deflection detection mechanism 58. The former 56 is adapted to measure one parameter indicative of the interaction between probe 20 and sample 12, and accordingly may be identical to the probe detection mechanism 24 of FIGS. 1 and 2 if this parameter is capacitance. The deflection detection mechanism 58 is arranged to measure the displacement of the probe's head and thus the bending of the cantilever 52, which is also indicative of interaction strength. A feedback mechanism 26 is arranged to drive the piezo 16 in respons to a signal that is received from the deflection detection mechanism 58 and thus to control relative height of the probe 54 and sample 12. Data collected by the interaction detection mechanism 56 is analysed and output to a display 28.

In taking images using the apparatus 50, the sample 12 Is first brought into the proximity of the cantilever probe 54 using the coarse driving means 18. Fine height and initial start position adjustments are made with the piezo driver 16 whilst the deflection detection mechanism 58 measures the cantilever's bending as a result of the probe 54—sample 12 interaction. Once the measured bending reaches a desired level, the sample surface is scanned beneath the probe 54. In scanning the sample 12 under the probe 54, the tuning fork 52 is set to vibrate into and out of the plane of the Figure (y axis). This oscillates the stage on which the sample is mounted. At the same time, the piezo 16 translates the sample 12 in a perpendicular (x) direction. Sample oscillation is with a relatively large amplitude, of the order of a few microns. During the course of a scan, readings are continually taken by the interaction 56 and deflection 58 detection mechanisms.

As before, by using a resonant oscillation, albeit of the sample 12 rather than the probe 54, to facilitate one component of a raster scan, data from the imaged area is collected at a far higher speed than may be achieved by prior art scanning force microscopes.

The feedback mechanism 26 is set to keep the average cantilever bend (averaged over many periods of sample oscillation) approximately constant, by raising or lowering the sample 12 as appropriate. The output signal from the interaction detection mechanism 56 is fed directly to a processor and display 28. In order to enable digital data processing, the collected scan line may be artificially pixellated by the processor.

The tuning fork 54 may be one of a number commercially available forks, or of bespoke design to provide a desired frequency of oscillation. A suitable example is a quartz crystal fork with resonant frequency of 32 kHz. A tuning fork is well suited to this application as it is design d with highly anisotropic mechanical properties. Its resonances are therefore independent and can be individually excited and so limited to only that (or those) in the plane of the sample. Importantly, the fork 54 can be resonated in one direction and scanned in another, without coupling occurring between modes. It therefore permits stable fast motion of the sample 12 as it is interrogated by the probe 54.

For some applications, the embodiment of the invention shown in FIG. 3 may possess several advantages over that shown in FIG. 1. The deflection detection mechanism 58 is of a type that is standard in the art of AFM microscopy: cantilever bend is measured using laser light reflected from the probe. By resonating the sample, instead of the probe, the optics measuring this deflection do not need to compensate for a scanning probe. This simplifies extraction of deflection data, and permits the mechanism to be housed within a stationary casing.

In an alternative to the embodiment shown in FIG. 3, the separate interaction detection mechanism 56 may be dispensed with and the output of the deflection detection mechanism 58 used to provide both image data and feedback. This probe detection mechanism is the traditional one used in prior art AFMs.

In another alternative, the probe 20, sample 12, plate 14 and tuning fork 52 are immersed in liquid. Ideally the cantilever probe 20 should have a low quality (Q) factor, but most commercially available AFM cantilevers (for example Si single crystal) in fact have a high Q factor. If the cantilever has a high Q, it will take a long time to respond to changes and it will ring at its resonant frequency if given a stimulus. Bespoke designs of cantilever can have low Q but an alternative route is simply to damp the Q factor by immersing in liquid.

There are also a number of potential modes of operation of the AFM, any one of which may be adopted in implementing this invention. In contact mode the probe is permanently held in contact with the sample. The bending of the cantilever may be measured and feedback based on its average value. In tapping mode the actuator drives the cantilever in a "tapping" motion at its resonant frequency. The cantilever therefore only contacts the surface for a very small fraction of its oscillation (tapping) period. This dramatically shortened contact time means that lateral forces on the sample are very much reduced and the probe is therefore less destructive to the specimen as the scan is taken. It is consequently much used for imaging sensitive biological specimens. In intermittent contact mode the cantilever is oscillated vertically off resonance. The amplitude of this oscillation or cantilever bending or both may then be measured, creating an image and feeding back on any combination of these two parameters. This intermittent contact reduces lateral forces but avoids the long response time associated with working at resonance if the Q factor of the cantilever is high.

In scanning a sample the probe of an AFM makes contact with the sample surface. Although this is disadvantageous if the sample is delicate, the interaction with the surface makes it possible to affect the properties of the surface and so deliberately "write" information to the sample. This technique is known as nanolithography. For example, by application of a voltage to a conductive cantilever a region of a metallic layer of a sample wafer can be oxidised. Another example exploiting two-photon absorption and polymerisation of a photoresist is described in "Near-field two-photon nanolithography using an apertureless optical probe" by Xiaobo Yin et al. in Appl. Phys. Lett. 81(19) 3663 (2002). In both examples the very small size of the probe enables information to be written to an extremely high density.

The AFM of this invention can also be adapted for use in nanolithography. This not only offers the potential for faster writing times than previously achieved by making us of a stable resonant oscillation of the probe, but also offers the potential for increased image resolution i.e. write density. The image resolution of the AFM embodiment of this invention is not limited by the stability of the microscope i.e. by the ability to address adjacent points with high accuracy, but rather by the interaction length. This means that, as a lithography tool, it has the potential to achieve a write-resolution considerably greater than the 50-100 nm achieved by prior art lithography systems.

It will be apparent to one skilled in the art of scanning probe microscopy that many variations of interaction parameter, feedback parameter, scanning motion and probe design may be implemented in accordance with this invention. For example, the local probe 20 used in the apparatus shown in FIG. 1 may be exchanged for a cantilever probe and the detection mechanism 24 adapted to be suitable for use with AFM. In this implementation of the invention, there are two resonant modes to be exploited. Used in tapping mode, the tapping is driven near to or at the resonant frequency of the cantilever. On the other hand, scanning oscillations, in accordance with this invention, are driven either at the resonant frequency of the cantilever/actuator assembly, if the probe is oscillated, or at the resonant frequency of the sample. In either case, the assembly or sample is more massive and this will ensure that the oscillation frequency is lower than the tapping frequency. Thus, inevitably, a number of contact points are sampled within each scan line. Probe deflection may be monitored via a piezoelectric coating on the probe.

In another alternative the probe detection mechanism 24 may be adapted to monitor and measure resonant oscillation amplitude, as described above in relation to an embodiment of the SCM. Instead of extracting capacitance measurements as an indicator of probe—sample interactions, anharmonic components of the damped oscillation are analysed and reconstructed to form an image. This implementation makes a three-fold use of resonant (or near resonant) probe or sampl oscillation: first to provide faster scanning than is known in prior art systems, secondly to provide the basis for measurement of the probe—sample interactions and thirdly to maintain the height.

A further alternative is again to control resonant oscillation amplitude via feedback, but in this embodiment the probe is tilted so that it is no longer normal to the surface. The tilted probe (or planar sample) is oscillated at resonance to collect each scan line, and a second detection system is set up to detect motion of the probe perpendicular to the angle of tilt. In this way the image is formed from small deviations in probe motion, normal to the tilt, measured by the second detection system within each oscillation cycle, whilst height control is via the main oscillation.

A still further alternative is to adapt both the probe 20, 54 and detection mechanisms 24, 56, 58 to detect variations in the probe interaction with a sample magnetic field. For this purpose the probe may be in the form of a conducting loop and the detection mechanism adapted to measure currents induced therein as the probe or sample is scanned resonantly. Alternatively the detection mechanism may measure changes in the resistance of the conducting loop. This latter alternative makes use of giant magnetoresistance, similar to that developed in a hard disk head on a resonantly oscillating probe. A third possibility is to use a metal probe, eddy currents will then provide a force resisting harmonic oscillation of the probe and the resulting anharmonic components may be again be used to form an image.

As will be apparent to one skilled in the art, there are many more techniques available for extracting probe—sample interaction information and these may be combined with the execution of a fast, resonant raster scan of the sampel surface, in accordance with the present invention.

The invention claimed is:

1. A scanning probe microscope for imaging a sample in accordance with an interaction between the sample and a probe, the microscope comprising a first driving means arranged to provide relative motion between the probe and the sample surface and capable of bringing the sample and probe into close proximity, sufficient for a detectable interaction to be established between them;

a probe detection mechanism arranged to measure at least one parameter indicative of the strength of the interaction between the probe and the sample;

a feedback mechanism arranged to provide for adjustment of probe-sample separation via operation of the driving means in response to a variation in an average value of one of the at least one parameters away from a predetermined set value; and a second driving means that causes resonant or near resonant lateral oscillation of either the sample or the probe, with an oscillation amplitude of at least one micrometer;

the microscope is arranged, in operation, to carry out a scan of the sample surface and a scan area is covered by an arrangement of scan lines, each scan line being provided by the lateral oscillation of either the probe or the sample such that oscillation amplitude directly determines maximum scan line length and the arrangement of scan lines is provided by operation of the first driving means, and readings are continually made by the probe detection mechanism to form an image corresponding to at least two variations of the measured parameter during each oscillation.

2. The microscope according to claim 1, wherein the probe is metallic and the parameter indicative of the interaction is capacitance of an interface between probe and sample.

3. The microscope according to claim 2, wherein a second parameter indicative of the interaction, and the one on which the feedback mechanism operates, is oscillation amplitude.

4. The microscope according to claim 2, wherein the probe detection mechanism comprises a modulation signal generator arranged to apply a modulating voltage across the interface between probe and sample in order to modulate its characteristics and thereby to affect its electrical capacitance, a resonator arranged to set up a resonating electric field in a circuit incorporating the probe and sample and a detector arranged to measure the electric field resonant frequency and thereby to enable variations in the capacitance of the interface to be measured as the modulating voltage is applied.

5. The microscope according to claim 1, wherein the probe is adapted to interact with a magnetic field and the probe detection mechanism is arranged to measure a parameter indicative of the magnetic interaction between the probe and the sample.

6. The microscope according to claim 1, wherein the probe comprises a cantilever and actuator arranged to drive the cantilever in a "tapping" mode.

7. The microscope according to claim 6 wherein the parameter indicative of the strength of the interaction is bending of the cantilever as it taps the sample.

8. The microscope according to claim 1, wherein the probe is an AFM cantilever and the one of the at least one parameter indicative of the strength of the interaction that is measured by the probe detection mechanism and used by the feedback mechanism is bending of the probe.

9. The microscope according to claim 8, the probe detection mechanism comprises an interaction detection mechanism arranged to measure at least one parameter indicative of the strength of the interaction between the probe and the sample and a deflection detection mechanism, the deflection detection mechanism being linked to the feedback mechanism and arranged to measure bending of the probe.

10. The microscope according to claim 8, wherein the probe comprises an actuator arranged to drive the cantilever in "tapping" mode.

11. The microscope according to claim 1, wherein the driving means is arranged to oscillate the probe.

12. The microscope according to claim 11, wherein the driving means includes a tuning fork.

13. The microscope according to claim 11, wherein the probe is oriented substantially vertically and the driving means is arranged to provide a relative linear translation of probe and sample in a direction substantially orthogonal to a probe oscillation plane, thereby defining a substantially rectangular scan area, the probe oscillation plane being defined by the orientation of the probe and an oscillation direction which is orthogonal to the orientation of the probe.

14. The microscope according to claim 11, wherein the probe is oriented substantially horizontally and the driving means is arranged to provide a relative linear translation of probe and sample in a direction substantially parallel to a probe oscillation plane, thereby defining a substantially rectangular scan area, the probe oscillation plane being defined by the orientation of the probe and an oscillation direction which is orthogonal to the orientation of the probe.

15. The microscope according to claim 11, wherein the probe is oriented substantially vertically and the driving means is arranged to provide a relative rotation of probe and sample about an axis substantially coincident with that about which the probe is oscillated, thereby covering the scan area by a circular arrangement of scan lines.

16. The microscope according to claim 1, wherein the means for oscillating either the probe or the sample is arranged to oscillate the sample.

17. The microscope according to claim 16, wherein the means for oscillating the sample is a tuning fork and the sample is attached thereto.

18. The microscope according to claim 1, wherein the feedback mechanism operates with a time constant which is greater than one cycle of probe oscillation and significantly less than total time taken to perform a scan.

19. The scanning probe microscope of claim 1, wherein the probe is an AFM cantilever and one of the at least one parameter indicative of the strength of the interaction is bending of the cantilever.

* * * * *